3,631,197
PRODUCTION OF TETRASILA-ADAMANTANE COMPOUNDS
Jerome M. Klosowski, Bay City, and Arthur J. Barry, Midland, Mich., assignors to Dow Corning Corporation, Midland, Mich.
No Drawing. Filed May 18, 1970, Ser. No. 38,498
Int. Cl. C07d 103/02
U.S. Cl. 260—448.2 E                        8 Claims

ABSTRACT OF THE DISCLOSURE

Tetrasila-adamantane compounds are produced by the high temperature (400° C.) and high pressure (1500 p.s.i.) reaction of methylhalosilanes in the presence of aluminum chloride or aluminum bromide as a catalyst and silicon or aluminum metal as an acid acceptor. The compounds are useful as mosquito repellents.

---

This invention relates to an improved method of producing tetrasila-adamantane compounds.

Tetrasila-adamantane compounds can be represented by the structural formula

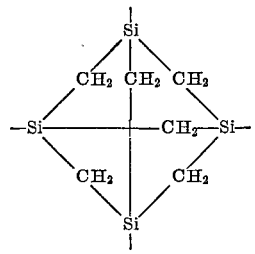

This cage structure, whose four bridgehead silicon valences are tetrahedrally arranged, forms a tetravalent nucleus which can be conveniently represented by the symbol "Ad." The methyl-substituted tetrasila-adamantane, $(CH_3)_4Ad$, has been produced by the pyrolysis of tetramethylsilane at 650° C.—see Fritz et al., "Carbosilanes," Advances in Inorganic and Radiochemistry, vol. 7, page 349, Academic Press (1965). The chlorinated compound, $AdCl_4$, was obtained in very low yield from the high temperature (500° C.) reaction of tetrachlorosilane and trimethylchlorosilane in the presence of aluminum chloride as reported in JACS, 83, 3345 (1961).

By practice of the present invention, wherein silicon or aluminum is used as an acid acceptor in the aluminum halide catalyzed reaction of halosilanes, the yield of tetrasila-adamantane compounds is greatly increased.

It is an object of the invention to provide an improved method of producing tetrasila-adamantane compounds.

In accordance with the invention, tetrasila-adamantane compounds of the general formula $R_4Ad$, in which each R is independently selected from the group consisting of the chlorine atom, the bromine atom and the methyl radical, are obtained by reacting $(CH_3)_nSiX_{4-n}$, in which X is a chlorine or bromine atom and n is an integer having a value of from 1 to 4, in the presence of (1) a catalyst selected from the group consisting of aluminum chloride, aluminum bromide and mixtures thereof, and (2) a metallic acid acceptor selected from the group consisting of silicon, aluminum and mixtures thereof, the reaction being effected at a temperature of at least 300° C. and a pressure in the range of 1000 to 2500 p.s.i.

The starting materials used in the process of the invention include $(CH_3)_2SiCl_2$, $(CH_3)_2SiBr_2$, $(CH_3)_3SiCl$, $CH_3SiBr_3$, $CH_3SiCl_3$, $(CH_3)_3SiBr$, $(CH_3)_4Si$; and mixtures of such materials. These compounds are well-known and most are commercially available.

The catalyst, aluminum chloride or aluminum bromide, is present in a "catalytic amount," generally in the range of about 2.5 to 15 percent by weight, based on the weight of reactants. The silicon or aluminum metals act as acid scavengers during the reaction and are necessary to obtain any appreciable yield of tetrasila-adamantane from the reaction. These metallic acid acceptors are effective in amounts as low as 2.5 percent by weight based on the weight reactants, while amounts greater than 50 weight percent do not give any additional benefit.

The reaction is conducted at a temperature of about 300° C. or greater. At temperatures below 200° C., the rate of reaction is so slow as to be impractical. Temperatures above 600° C. may result in thermal degregration of the product. The optimum temperature of reaction is in the range of from about 350°–450° C. The reaction is usually complete in from 2 to 8 hours.

The product of the reaction is a mixture of variously substituted tetrasila-adamantanes, including $CH_3AdCl_3$, $CH_3AdBr_3$, $(CH_3)_2AdCl_2$, $(CH_3)_2AdBr_2$, $(CH_3)_3AdCl$, $(CH_3)_3AdBr_2$, $CH_3AdClBr_2$, $(CH_3)_2AdBrCl$, $AdBr_4$, and $AdCl_4$. Pure species of the products can be isolated by sublimation if desired.

The product species having at least one methyl substituent have been determined to be useful as mosquito repellents. The tetrahalo-tetrasila-adamantanes can be reacted with tetramethylsilane in the presence of aluminum chloride to yield the useful methyl-substituted tetrasila-adamantanes. This ligand redistribution reaction proceeds well at atmospheric pressure and relatively low temperatures, for example 60° C. Exemplary of such a redistribution is the reaction shown below:

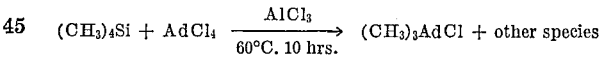

The following examples are illustrative, but not limiting, of the invention which is delineated in the claims.

EXAMPLE 1

A 2.4 liter steel pressure vessel was charged with 651 grams of trimethylchlorosilane, 17.5 grams of aluminum and 33 grams of aluminum chloride. The pressure vessel was then heated to 390–398° C. for 4½ hours while being rolled to agitate the contents which reached a peak pressure of about 2200 p.s.i. Upon cooling to room temperature, a residual pressure of 530 p.s.i. was retained. Low boiling product, principally methane, was distilled from the pressure vessel at atmospheric pressure to a vapor temperature of 160° C. at 5–10 mm. Hg. Upon sublimation, the remaining product yielded (CH₃)₃AdCl. (CH₃)₂AdCl₂ and CH₃AdCl₃, each of which were identified by g.l.c. analysis and mass spectral data.

EXAMPLE 2

A mixture of 651 grams of trimethylchlorosilane, 17.5 grams of silicon, 17.5 grams of aluminum and 3.3 grams of aluminum chloride were reacted in the manner set forth in Example 1 for 3.8 hours at 390–398° C. After cooling to room temperature, residual pressure in the vessel was 540 p.s.i. The reaction mixture was distilled to give 5.45 grams of (CH₃)₂AdCl₂ and 22.33 grams of CH₃AdCl₃, each of which were identified by g.l.c. analysis and mass spectral data.

EXAMPLE 3

A mixture of 684 grams of trimethylchlorosilane, 17.5 grams of silicon and 43 grams of aluminum chloride were reacted at from 390–398° C. at a pressure of about 1000 p.s.i. for 6 hours. The final pressure was 2330 p.s.i. After cooling to room temperature, a residual pressure of 430 p.s.i. was retained. The reaction mixture was distilled and sublimed to obtain 0.3 gram of (CH₃)₃AdCl, 6.3 grams of (CH₃)₂AdCl₂ and 14.7 grams of (CH₃)AdCl₃.

EXAMPLE 4

A mixture of 12 moles of dimethyldichlorosilane, one mole of silicon, one mole of aluminum and 10 weight percent, based on the weight of the reactant, of aluminum chloride were reacted in the previously-described pressure vessel for 10 hours at 395° C. The final pressure was 1450 p.s.i. The principal product was AdCl₄.

In a similar experiment tetramethylsilane was reacted in the presence of silicon, aluminum and aluminum chloride for 6.5 hours, attaining a final pressure of 2310 p.s.i. to yield (CH₃)₄Ad and (CH₃)₃AdCl.

EXAMPLE 5

The methyl-substituted tetrasila-adamantanes produced by the method of the invention were determined to be mosquito repellents by means of the following procedure: 2″ x 2″ shaved areas of the skin on the tester's forearms and backs of hands were exposed for a given period of time to approximately 500 mosquitoes of the species Aëdes aegypti in a 12″ x 12″ x 12″ cage. The mosquitoes had been denied warm blood for three days. The mosquitoes were excited and put to flight before the hand or arm was put into the cage. The arm or hand was masked with polyethylene sheet material except for the test area. As a control, the untreated skin was exposed to the mosquitoes and the number of landings and bites were recorded. The methyl-substituted tetrasila-adamantane compositions were then applied to the control area and it was again exposed to the same mosquitoes for at least a comparable period of time; the number of landings and bites being recorded. No test area was used for more than one repellent. Exemplary data obtained by this procedure is given below:

That which is claimed is:
1. A method of producing tetrasila-adamantanes of the general formula

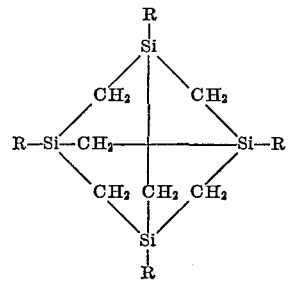

in which each R is independently selected from the group consisting of the chlorine atom, the bromine atom and the methyl radical; said method comprising reacting

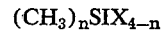

in which X is a chlorine or bromine atom, $n$ is a integer having a value of from 1 to 4, in the presence of (1) a catalyst selected from the group consisting of aluminum chloride, aluminum bromide and mixtures thereof and (2) a metallic acid acceptor selected from the group consisting of silicon, aluminum, and mixtures thereof, at a temperature of at least about 300° C. and a pressure in the range of 1000 to 2500 p.s.i.

2. The method of claim 1 wherein said catalyst is aluminum chloride bromide.

3. The method of claim 1 wherein said catalyst is aluminum bromide.

4. The method of claim 1 wherein said acid acceptor is aluminum.

5. The method of claim 1 wherein said acid acceptor is silicon.

6. The method of claim 1 wherein said reactant is trimethylchlorosilane.

7. The method of claim 1 wherein said catalyst (1) is present in an amount in the range of about 2.5 to 15 percent by weight based on the weight of reactants and said metallic acid acceptor (2) is present in an amount in the range of about 2.5 to 50 percent by weight, based on the weight of the reactants.

8. The method of claim 7 wherein said temperature is in the range of about 350 to 450° C.

References Cited

UNITED STATES PATENTS 3,342,880  9/1967  Reinhardt _____ 260—448.20 X

TOBIAS E. LEVOW, Primary Examiner

P. F. SHAVER, Assistant Examiner

U.S. Cl. X.R.

260—448.2 D; 424—184, Digest 10

| Compound | Amount applied 1 to 2″ x 2″ area (grams) | Time exposed | Landings | Bites |
|---|---|---|---|---|
| Control | None | 1 min. 40 sec | 54 | 40 |
| 50% (CH₃)₄Ad 30% (CH₃)₂AdCl₂ 20% (CH₃)₃AdCH₂Si(CH₃)₃ | 0.09 | 2 min | 24 | 3 |
| Control | None | 30 sec | 11 | 11 |
| 60% AdCl₄ 40% CH₃AdCl₃ | <0.03 | 30 sec | 8 | 3 |